United States Patent [19]

Delaunay

[11] 4,219,105
[45] Aug. 26, 1980

[54] DISC BRAKE AND A NOISE-REDUCING SPRING FOR SUCH A BRAKE

[75] Inventor: Jean Delaunay, Drancy, France

[73] Assignee: Societe Anonyme D.B.A., Paris, France

[21] Appl. No.: 34,530

[22] Filed: Apr. 30, 1979

[30] Foreign Application Priority Data

May 11, 1978 [FR] France .................. 78 13976

[51] Int. Cl.² .................................. F16D 65/00
[52] U.S. Cl. ........................... 188/73.5; 192/30 V
[58] Field of Search ............... 188/73.3, 73.5, 73.6, 188/205 A; 192/30 V, 70.13, DIG. 1

[56] References Cited

U.S. PATENT DOCUMENTS

| | | | |
|---|---|---|---|
| 3,592,301 | 7/1971 | Auth | 188/73.6 |
| 3,783,980 | 1/1974 | Kallmeyer | 188/73.6 X |

FOREIGN PATENT DOCUMENTS

| | | | |
|---|---|---|---|
| 1575945 | 1/1970 | Fed. Rep. of Germany | 188/73.5 |
| 1928991 | 12/1970 | Fed. Rep. of Germany | 188/73.6 |
| 2114812 | 10/1971 | Fed. Rep. of Germany | 188/73.5 |
| 2225178 | 1/1974 | Fed. Rep. of Germany | 188/73.5 |
| 2721806 | 12/1977 | Fed. Rep. of Germany | 188/73.5 |

Primary Examiner—George E. A. Halvosa
Attorney, Agent, or Firm—Paul David Schoenle; Ken C. Decker

[57] ABSTRACT

A disc brake includes a caliper which receives two friction elements. Opposed edges of a friction element and the caliper respectively define a gap therebetween. A noise reducing spring of the brake includes a pair of resilient opposed arms. The resilient arms of the spring fit into the gap and cooperate with the gap-defining edges to reduce brake noise. A mounting pin carried by the caliper supports the friction elements therein. An aperture defined by the spring receives the mounting pin so that the spring is pivotally mounted relative to the caliper and friction elements. Upon installation, the spring is placed in its inoperative position with its resilient arms disposed away from the gap. After the friction elements and mounting pins are in place, the spring is pivoted into place and a tab of the spring snaps into a recess of the caliper to lock the spring in its operative position.

2 Claims, 4 Drawing Figures

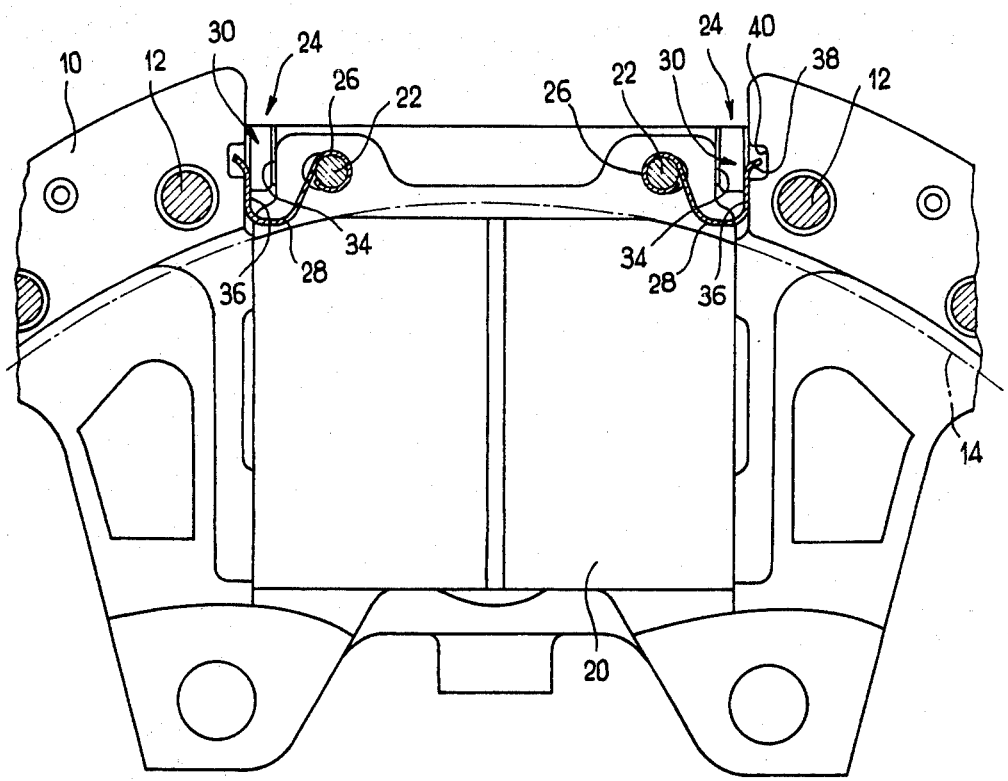
FIG_2
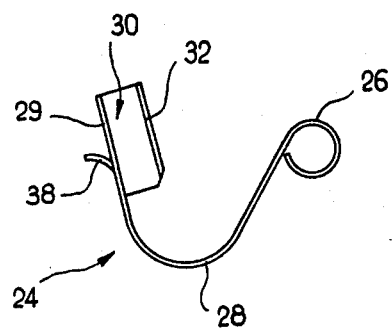
FIG_4

DISC BRAKE AND A NOISE-REDUCING SPRING FOR SUCH A BRAKE

The invention relates to a disc brake for a motor vehicle and to a noise-reducing spring for use in a brake of this kind.

Most known disc brakes have a support member which receives and anchors two friction elements capable of engaging the opposite faces of a rotary disc upon operation of operating means comprising, as the case may be, two oppositely arranged brake actuators acting directly on the respective friction elements, or a single brake actuator acting directly on one firction element and acting on the other friction element by way of a movable caliper. In all these types of brake, at least one friction element slides relative to the support member which receives and anchors it, and there must therefore necessarily be operating clearances between this friction element and the support member. Owing to the vibration invariably found when such brakes are installed in a motor vehicle, this operating clearance produces undesirable noise, which is normally reduced or forestalled by means of one or more noise-reducing springs.

Of the numerous known noise-reducing springs, the most common are springs independent of the friction elements and which are installed either together with of after the friction elements.

When the friction elements and spring are installed simultaneously, installation is particularly difficult, since it demands the simultaneous manipulation of at least three distinct components, and usually of four or five distincts components, the assembly being often locked in position with the aid of one or two mounting pins provided for the friction elements.

If, however, the spring is put on after the friction elements have been installed in the brake, assembly of these elements and the spring is easier. Usually it is done by clipping the nose-reducing spring on to mounting pins for the friction elements. For design reasons. however, the latter type of spring is more liable to escape accidentally, which may conflict with the standards of reliability demanded.

More recently, it has been proposed that a noise-reducing spring should be attached to each friction element before it is installed in the brake. Such a solution has numerous advantages; in particular, it eliminates the above mentioned risk of accidental escape of the spring, and it ensures that the noise reducing spring is positioned properly and is replaced at the same time as the pads. However, although the installation of the friction elements and springs is easier than when the latter are totally independent, the fact remains that the installation of the friction elements and the attached springs is not always easy if the spring is stiff, as is generally the case if the spring is to fulfill its noise-reducing function.

The invention proposes a disc brake equipped with friction elements and with at least one noise-reudcing spring which is not liable to escape accidentally and which is especially simple to install, irrespective of whether the spring is attached to the friction element before installation of the latter in the brake.

To this end, the invention proposes a disc brake comprising a support member which receives and anchors at least one friction element capable of engaging a corresponding face of a rotary disc upon operation of operating means associated with the support member, at least one mounting pin transversing a corresponding aperture in the friction element, and at least one noise-reducing spring being provided to urge the friction element towards a predetermined position relative to the pin, said spring comprising a curled portion encircling the pin, by way of which it can pivot in order, when it is installed, to bring an operative portion of the spring ito an open space formed between the support member and friction element to receive the operative portion of the spring when this operative portion occupies its normal operative position, characterized in that locking means are provided to hold the operative portion in its normal operative position.

Such a feature enables the spring to be installed in two stages. In the first stage, which may be carried out either before or after the friction element is inserted in the brake, the spring is hooked by way of its curled portion round the pin traversing the aperture in the friction element. In the second stage, the spring is then pivoted on the pin to bring it into its operative position. Consequently the installation of the friction element in the brake, whether the spring has been attached to this element before installation or is attached to it during installation, can be done without difficulty, since at this time the spring's operative portion is free of the support member and of the friction element. However, when the operative portion of the spring is placed in position in the second stage, any risk of accidental escape of the spring is completely eliminated, both by the locking means which prevent the spring's operative portion from escaping from the open space housing it, and, in particular, by the curled portion which attaches the spring to the pin.

According to another feature of the invention, the locking means comprises at least one retractable locking tab formed on the spring and receivable in a recess in the support member.

The invention also relates to a noise-reducing spring designed for a disc brake embodying the invention.

A particular embodiment of the invention will now be described by way of example only with reference to the accompanying drawings, in which:

FIG. 2 is a section along a line 2—2 in FIG. 1;

FIG. 4 is a side view of the spring shown in FIG. 3.

Figure 1:
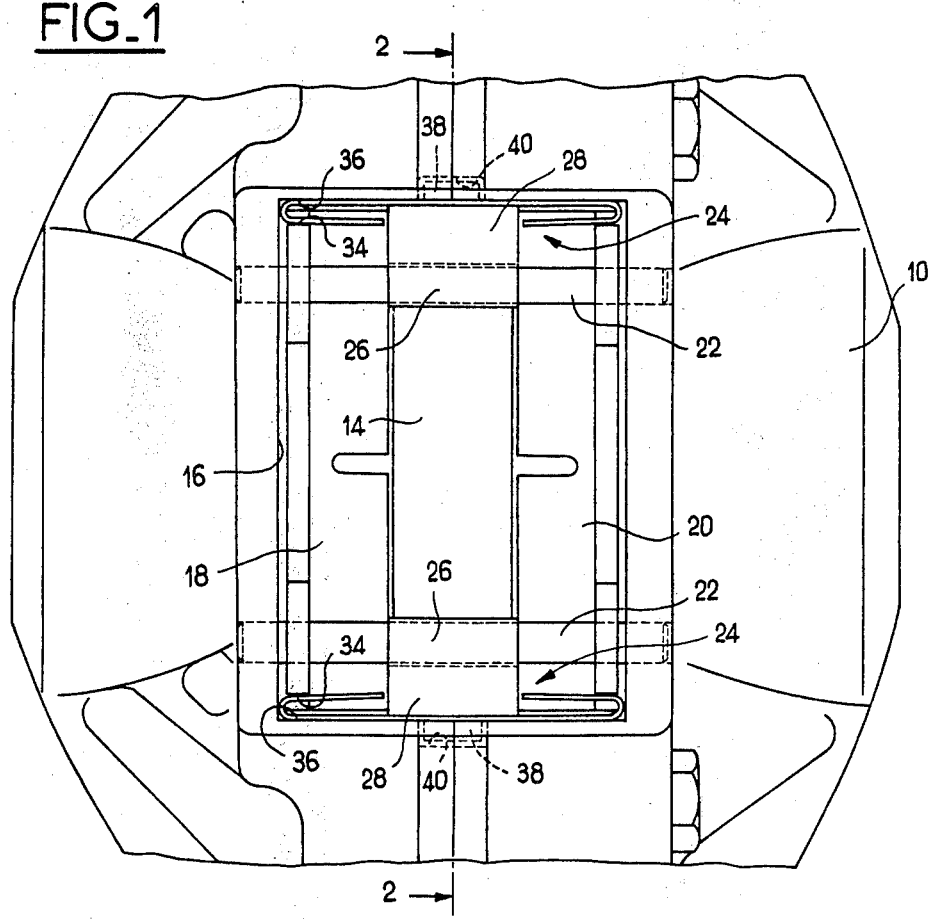
FIG. 1 is a plan view of a disc brake embodying the invention.

The disc brake illustrated in FIGS. 1 and 2 comprises a support member 10, in two portions joined together by screws 12, and designed to be supported by a nonrotary component in the vicinity of one wheel of the vehicle (not shown). The support member 10 straddles a rotary disc 14 and defines, in that portion of it straddling the disc, a substantially rectangular radial aperture 16 in which are received and anchored two friction elements 18, 20 capable of engaging the corresponding faces of the disc 14 upon operation of the operating means (not shown) associated with the support member 10 and consisting, for example, of two hydraulic brake actuators of any known type acting directly on the respective friction elements 18, 20. Each friction element 18, 20 comprises in a known manner a backing plate to which a friction lining is attached.

To prevent accidental escape of the friction elements 18, 20, two guide pins 22 are attached to the support member 10 and traverse corresponding apertures in the backing plate of each friction element 18, 20. Preferably, the apertures in the backing plates of the friction elements are elongated in a circumferential direction relative to the disc 14, to prevent any of the braking torque from being transmitted from the friction elements 18, 20 to the support member 10 by way of the pins 22.

Figure 3:
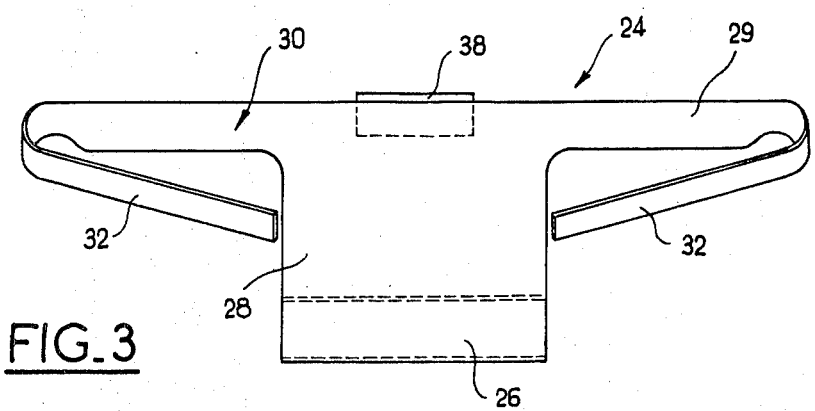
FIG. 3 is a plan view on a larger scale of one of the springs for the disc brake shown in FIGS. 1 and 2, as seen in the position which it occupies before being installed in the brake.

In accordance with the invention, a noise-reducing spring 24 is attached to each pin 22 by way of a curled portion 26, by means of which it can pivot on the pin 22. As best shown in FIG. 3, each spring 24 is a metal leaf spring substantially forming a T of which the lower portion 28 ends in the curled portion 26. The portion 28 is rounded and defines a convex surface directed radially inwards into the brake when the spring 24 is installed in the brake. The crosspiece 29 of the T formed by the spring 24 defines an operative portion 30 urging each friction element 18, 20 into a predetermined position relative to the pins 22. As FIG. 3 shows, the crosspiece 29 of the T formed by the spring 24 is bent through approximately 180° at each of its ends 32 to engage a corresponding surface 34 formed at the end of the backing plate of each friction element 18 or 20 opposite a corresponding surface 36, which is formed on each of the circumferentially spaced edges of the aperture 16 in the support member 10, and on which the crosspiece 29 of the T defined by the spring 24 comes to bear. As best shown in FIG. 2, the mutually opposite surfaces 34, 36 formed respectively on the friction elements 18, 20 and on the support member 10 define between them a space which is open radially towards the exterior of the brake and which receives the operative portion 30 of the spring 24 when the latter pivots on the pin 22 during installation. Lastly, locking means are provided to prevent accidental pivoting of the spring 24 after the operative portion 30 has been brought into the open space defined between the opposite surfaces 34 and 36. These locking means comprises a retractable locking tab 38 formed in the central portion of the crosspiece 29 of the T defined by the spring 24 and received in a recess 40 defined in the respective circumferentially spaced edge of the aperture 16 formed in the support member 20. The locking tab 38 is preferably formed by part of the metal leaf constituting the spring 24, this part being bent outwards relative to the portion 30 so that it can retract when the spring 24 pivots on the pin 22 during installation and so that it prevents the spring 24 from pivoting in the opposite direction after installation.

The limb 28 of the spring 24 is arranged so that it overhangs the disc 14 and its width slightly exceeds the thickness of the disc, so that the limb 28 acts as a stop for the backing plates of the friction elements 18, 20 when the friction linings of the latter are worn. Also, the bent ends 32 of the crosspiece 29 of the T defined by each spring 24 extend to near the edges of the limb 28, so that they can cooperate with the surface 34 defined on the backing plate of each friction element 18, 20 even when the friction linings of the latter are worn.

Installation and removal of the friction elements 18, 20 and springs 24 for the disc brake described with reference to FIGS. 1 and 2 take place as follows.

In the embodiment described, the springs 24 are not attached to the friction elements 18 or 20, and their installation is therefore carried out in a first stage simultaneously by introducing the pins 22 into the curled portion 26 defined in each spring 24 and into the appropriate apertures defined in the backing plate of each friction element 18 or 20. During this operation, the operative portion 30 of each spring 24 is held out of the open space defined between the surfaces 34 and 36, so that the spring does not offer any resistance and installation of the pins 22 can be performed readily. In a second stage, each spring 24 is pivoted on its pin 22 to bring its operative portion 30 into the open space defined between the mutually opposite surfaces 34, 36, this being facilitated because the convex surface of the limb 28 of each spring 24 faces into this open space before the spring pivots on the pin 22. During this movement, the locking tab 38 of each spring 24 retracts to allow positioning of the operative portion 30 and then clips into the recess 40 formed in the support member 10 and engages the upper edge of this recess 40, so preventing the operative portion 30 from escaping from the open space defined between the surfaces 34, 36.

The cooperation of the locking tab 38 of each spring 24 with the corresponding recess 40 in the support member 10 and the cooperation of the curled portion 26 with the corresponding pin 22 eliminate all risk of accidental escape of the springs 24. Also, as the preceding description of installation demonstrates, installation is particularly simple, being broken down into two stages so that the prestress stored in the spring's operative portion cannot interfere with installation of the friction elements as the operative portion is not placed in position until after they have been installed.

The removal of the friction elements 18, 20 and springs 24 is also very easy being performed simply by removing the mounting pins 22.

The embodiment of the invention just described is not restrictive, either in respect of the type of disc brake or in respect of the structure of the spring. The disc brake just described may, of course, be replaced with a brake of some other kind, for example one in which the operating means comprise a single actuator which acts on one friction element directly and on the other friction element by way of a member movable relative to the support member. Similarly, a single spring might be used instead of the two symmetrically arranged springs used in the embodiment described, or, again, at least one spring might be associated with each friction element, for example by means of pins or rivets which connect the springs to the friction elements. In such a case, of course, other means than the mounting pins and corresponding apertures would be provided to prevent radial escape of the friction elements. Lastly, the noise-reducing springs could be made of wire, instead of sheet-metal as in the embodiment described, although the use of sheet-metal is generally preferable.

What I claim is:

1. In a disc brake, a disc mounted for rotation with a member to be braked, said disc defining a pair of opposed friction faces, a pair of friction elements disposed adjacent said friction faces for engagement therewith when a brake application is effected, a fixed support member straddling said disc and supporting said friction elements, fluid pressure responsive means carried by said fixed support for urging said friction elements against said friction faces, said fixed support defining an opening receiving said friction elements, said opening having a pair of opposed edges facing corresponding edges on the friction elements, one edge of one of the friction elements cooperating with a corresponding edge of the opening to define a gap therebetween, a mounting pin carried by said fixed support for supporting said friction elements in said opening, and a noise reducing spring cooperating with the friction elements and said fixed support, said spring including a pair of resilient arms movable relative to each other, said spring defining an aperture receiving said mounting pin so that the mounting pin supports said spring for rotation around said mounting pin from an inoperative position in which the spring is supported by said mounting pin with the arms of the spring disposed away from said gap to an operative position in which the arms of the spring are disposed in said gap, said arms yieldably engaging said corresponding edge of the opening and said one edge of the friction element respectively when the spring is disposed in said operative position, said one edge of said opening defining a recess, said spring including a tab projecting into said recess when the spring is disposed in the operative position to thereby prevent rotation of said spring out of the operative position.

2. The invention of claim 1, wherein said aperture in said spring is defined by a curled portion of the spring.

* * * * *